(12) United States Patent
Veeraraghavan et al.

(10) Patent No.: US 7,899,475 B2
(45) Date of Patent: Mar. 1, 2011

(54) ENHANCED SHORT MESSAGE SERVICE (SMS)

(75) Inventors: Rajesh Veeraraghavan, Bangalore (IN); Vibhore Goyal, Bangalore (IN); Kentaro Toyama, Bangalore (IN); Sean Olin Blagsvedt, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 11/552,883

(22) Filed: Oct. 25, 2006

(65) Prior Publication Data

US 2008/0102862 A1     May 1, 2008

(51) Int. Cl.
*H04W 4/00*     (2009.01)
*G06F 17/20*     (2006.01)
*G06F 17/21*     (2006.01)
*H04K 1/00*     (2006.01)
*H04L 9/00*     (2006.01)
*H04L 9/08*     (2006.01)

(52) U.S. Cl. .............................. 455/466; 704/8; 704/10; 380/255; 380/277; 380/281

(58) Field of Classification Search .................. 455/466
See application file for complete search history.

(56) References Cited

U.S. PATENT DOCUMENTS

| | | | |
|---|---|---|---|
| 6,920,331 B1 * | 7/2005 | Sim et al. | 455/466 |
| 2004/0120526 A1 * | 6/2004 | Hamberg | 380/277 |
| 2004/0123152 A1 * | 6/2004 | Le Saint | 713/201 |
| 2004/0133417 A1 * | 7/2004 | Azuma | 704/8 |
| 2005/0027731 A1 * | 2/2005 | Revel | 707/101 |
| 2005/0123138 A1 * | 6/2005 | Abe et al. | 380/255 |

OTHER PUBLICATIONS

Communication networks : fundamental concepts and key architectures, Alberto Leon-Garcia, Indra Wadjaja (2004) at p. 766.*
Motorola V710 CDMA Celluar Phone Operators Manual, 2004, p. 79.*
Motorola V710 Cellular Phone, CNET Editor's Review, Sep. 30, 2004.*
Printout from Aalborg Univeristy Website regarding SMS Zipper Software (2008).*

(Continued)

*Primary Examiner*—Dwayne D Bost
*Assistant Examiner*—Joshua Schwartz
(74) *Attorney, Agent, or Firm*—Perkins Coie LLP

(57) ABSTRACT

A facility for sending enhanced SMS messages is provided. The facility at a sending SMS subscriber unit encodes the original text of an SMS message to produce an encoded SMS message, and transmits the encoded SMS message for receipt by the intended recipient of the SMS message. The facility at a receiving SMS subscriber unit receives the transmitted encoded SMS message and decodes the encoded SMS message to produce the original text of the SMS message. In some instances, the facility at the receiving SMS subscriber unit may not decode the received encoded SMS message and, thus, provide the received SMS message in its received form. In some instances, the facility at the sending SMS subscriber unit may send the original text of the SMS message and have the receiving SMS subscriber unit decode (translate) the original text into a different form.

19 Claims, 8 Drawing Sheets

OTHER PUBLICATIONS

Prinout from SMS Zipper Website (2008).*
Motorola V710 CDMA Celluar Phone Operators Manual, 2004, pp. 30 and 31.*
"Input Normalization for and English to Chinese SMS Translation System" by AwAiTi et al. , presented at the Machine Translation Summit 2005.*

Communication networks : fundamental concepts and key architectures, Alberto Leon-Garcia, Indra Wadjaja (2004) at p. 777.*

Program Schedule for Data Compression Conference (DCC 2006) at Snowbird, Utah, Mar. 28-30, 2006.*

* cited by examiner

ENHANCED SHORT MESSAGE SERVICE (SMS)

BACKGROUND

Electronic communications such as Short Message Service (SMS) messaging are being increasingly used for both business and personal uses. Electronic communications have many advantages over non-electronic communications such as postal mail. These advantages include low cost, rapid delivery, ease of storage, and so on.

Generally, SMS is a wireless service that allows for point-to-point communication of short text messages (160 7-bit characters, 140 8-bit characters, or 70 16-bit characters) to and from wireless digital communications devices, such as mobile phones. Within the SMS service, an SMS message is transported via store-and-forward transport mechanisms, such as Global System for Mobile (GSM) mobile telephony network, Universal Mobile Telecommunications System (UMTS), General Packet Radio Service (GPRS), etc., to a Short Message Service Center (SMSC). The SMSC attempts to deliver the SMS message to the recipient. If the recipient of the SMS message (the SMS message recipient's digital communications device) is not reachable at a given moment, the SMSC will store the SMS message for subsequent delivery. Later, when the recipient is reachable, the SMSC retries the delivery process. Thus, the SMS service allows an active subscriber unit, such as a mobile phone, to transmit and receive an SMS message at any time.

In many SMS markets, SMS service providers currently charge their subscribers on a per message basis. For example, a subscriber is charged a flat fee, such as ten cents U.S., for each SMS message sent or received by the subscriber. Because a single SMS message is typically limited to 160 7-bit characters, SMS messages that are longer than 160 characters are sent as multiple SMS messages, with each one of the multiple messages being charged the per message rate. Thus, with the current limitation on the amount of text that can be sent in a single SMS message, sending large amounts of text using SMS messages can quickly become impractical due to the associated cost.

Moreover, with SMS messaging, the receiver of an SMS message receives the exact text that was input by the sender of the SMS message. Many subscribers use digital communications devices such as mobile phones to send and receive SMS messages. Unfortunately, many of these devices only include a 12 button numeric keypad instead of a full alphabetic keyboard. Using a limited keypad for inputting an SMS message requires substantially more effort (e.g., it is cumbersome and time consuming to type a character using the 12 button numeric keypad because multiple characters may be assigned to a single key in the keypad). To overcome this problem, a subscriber may input a cryptic SMS message that is less cumbersome and time consuming for sending as an SMS message. Because the receiver of the SMS message receives the exact text that was input by the sender, if the receiver of the cryptic SMS message does not understand the "lingo" used by the sender, the receiver of the cryptic SMS message will not be able to translate and understand the cryptic SMS message.

SUMMARY

A facility for sending enhanced SMS messages is provided. The facility at a sending SMS subscriber unit encodes the original text of an SMS message to an encoded version of the original text, and transmits the encoded version of the original text in an SMS message for receipt by the intended recipient of the SMS message. The original text is the text of the SMS message as originally provided by the sender (e.g., human user of the sending SMS subscriber unit) of the SMS message. The facility at a receiving SMS subscriber unit receives the transmitted encoded SMS message and decodes the contents of the received encoded SMS message to produce the original text. In some instances, the facility at the receiving SMS subscriber unit may decode the received encoded SMS message to produce a decoded SMS message that is different than the original text. In some instances, the facility at the receiving SMS subscriber unit may not decode the received encoded SMS message and, thus, provide the received SMS message in its received form. In some instances, the facility at the sending SMS subscriber unit may send the original text of the SMS message and have the receiving SMS subscriber unit decode (translate) the original text into a different form.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
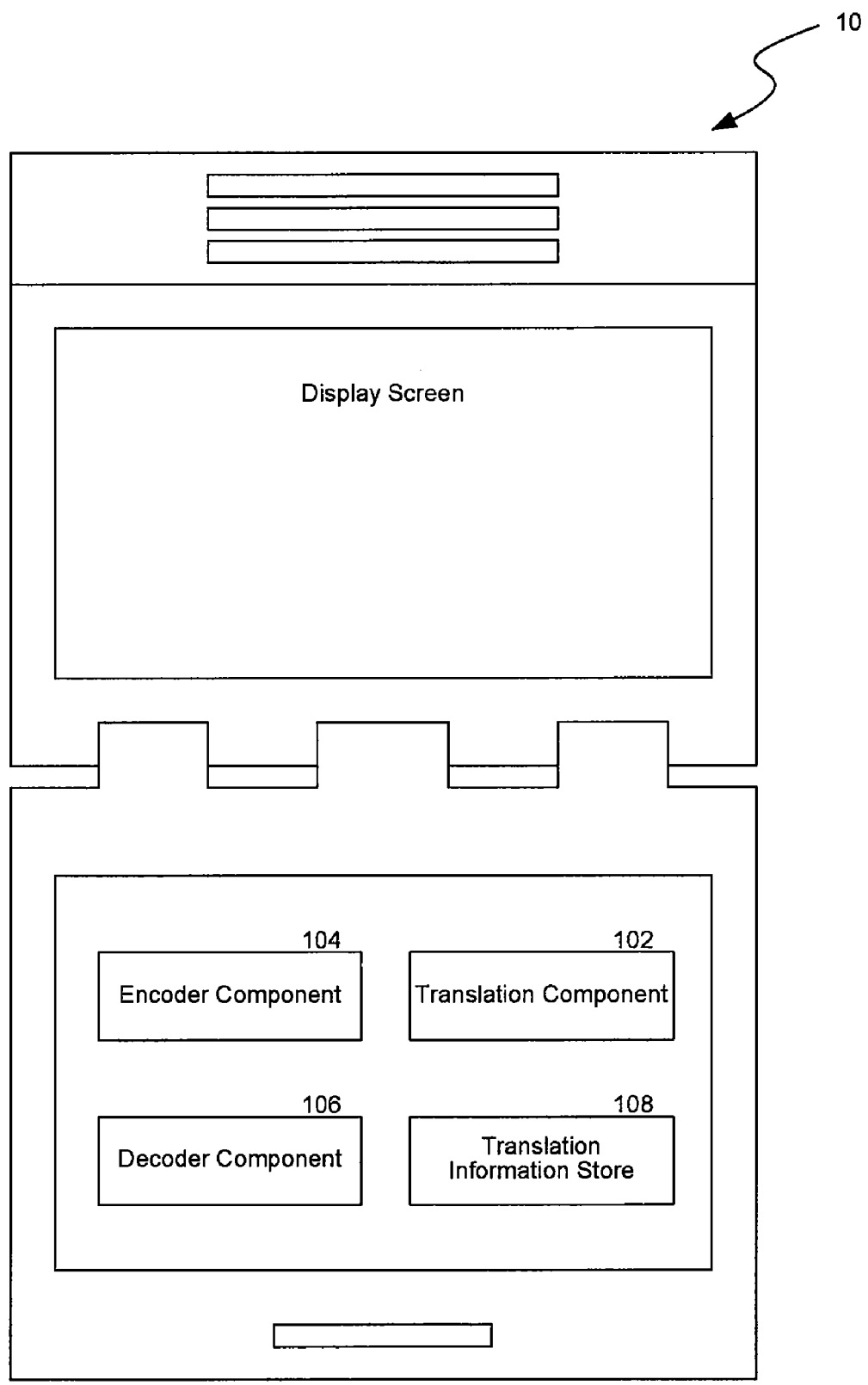
FIG. 1 is a diagram that illustrates selected components of an SMS subscriber unit implementing the facility, according to some embodiments.

A facility for sending enhanced SMS messages is provided. In some embodiments, the facility at a sending SMS subscriber unit encodes the original text of an SMS message to an encoded version of the original text, and transmits the encoded version of the original text in an SMS message (encoded SMS message) for receipt by the intended recipient(s) of the SMS message. The original text is the text of the SMS message as originally provided by the sender (e.g., human user of the sending SMS subscriber unit) of the SMS message. The facility at a receiving SMS subscriber unit receives the transmitted encoded SMS message and decodes the contents of the received encoded SMS message to produce the original text. By encoding the original text of the SMS message to an encoded version prior to sending the SMS message at the sending node, and decoding the encoded version of the SMS message to the original text at the receiving node, the facility allows for the sending of enhanced SMS messages. By way of example, the original text of an SMS message may be 200 characters (7-bit character encoding), thus requiring two SMS messages to send. The facility at the sending SMS subscriber unit can encode the original text of this SMS message to an encoded version of the original text that is less than 140 bytes, thus enabling the encoded version of the original text to be sent in a single SMS message. The set of encoding rules (also referred to interchangeably herein as "encoding rules" or "encoding information") for encoding (or translating) the original text to an encoded version of the original text may be maintained in memory on the sending SMS subscriber unit. When the SMS message is received at the receiving SMS subscriber unit, the facility at the receiving SMS subscriber unit can decode the encoded version of the SMS message to produce the original text of the SMS message. The set of decoding rules (also referred to interchangeably herein as "decoding rules" or "decoding information") for decoding (or translating) the encoded version of the original text back to the original text may be maintained in memory on the receiving SMS subscriber unit. In order to produce the original text from the encoded version, the set of decoding rules applied at the receiving SMS subscriber unit needs to be the inverse of the set of encoding rules which were applied to the original text at the sending SMS subscriber unit to produce the encoded version.

In some embodiments, the facility at the sending SMS subscriber unit can send the set of decoding rules to the receiving SMS subscriber unit prior to sending the SMS message or messages to which the set of decoding rules are to be applied. For example, the decoding rules may be specified using Extensible Markup Language (XML), and the facility can send the XML statements to the SMS subscriber unit one or more SMS messages. The facility may also send to the SMS subscriber unit in one or more SMS messages containing binary content that specifies the decoding rules. In some embodiments, the facility may specify an applicable period that denotes a period of validity of the associated set of decoding rules. In an example, the applicable period may be specified as a period of time (e.g., from Time1 to Time2, until Time1, etc.) during which the set of decoding rules are to apply. In another example, the period of validity may be a specification of a number of SMS messages to which the facility at the SMS subscriber unit is to apply the set of decoding rules. In some embodiments, the facility at the sending SMS subscriber unit may request that the receiving SMS subscriber unit retrieve the set of decoding rules from a remote location such as a remote server, web site, etc. In response, the facility at the receiving SMS subscriber unit can download or otherwise obtain the indicated set of decoding rules from the specified remote location.

In some embodiments, an SMS subscriber unit may contain multiple sets of encoding rules, and the sender of an SMS message may specify the set of encoding rules that the facility at the sending SMS subscriber unit is to apply to the original text to produce the encoded version of the original text. For example, the facility may provide a user interface (UI) through which the sender can view the available sets of encoding rules and specify a desired set of encoding rules. Similarly, an SMS subscriber unit may contain multiple sets of decoding rules, and the sending SMS subscriber unit may specify the set of decoding rules that are to be applied to an SMS message. For example, the facility at the sending SMS subscriber unit can include in an SMS message an indication of the set of decoding rules that is to be applied to the SMS message by the receiving SMS subscriber unit.

In some embodiments, the facility at the receiving SMS subscriber unit decodes the received encoded SMS message to produce a decoded version of the received SMS message that is different than the original text of the SMS message that was encoded by the sending SMS subscriber unit to produce the encoded SMS message. To produce a decoded version of an SMS message that is different than the original text of the SMS message, the facility at the receiving SMS subscriber unit can apply a set of decoding rules that is not the inverse of the set of encoding rules which were applied to the original text at the sending SMS subscriber unit.

In some embodiments, the facility at the receiving SMS subscriber unit does not decode the received encoded SMS message. For example, although the facility at the sending SMS subscriber unit encodes the original text of an SMS message to produce an encoded version of the SMS message and sends the encoded SMS message, the facility at the receiving SMS subscriber unit does not decode the received encoded SMS message. Rather, the receiving SMS subscriber unit outputs the encoded SMS message as received from the sending SMS subscriber unit. By way of example, the encoded SMS message may be a version that is desired by the recipient of the encoded SMS message.

In some embodiments, the facility at the receiving SMS subscriber unit decodes the received original text of the SMS message to produce a decoded version of the original text of the SMS message that was received. For example, the facility at the sending SMS subscriber unit may send the original text of the SMS message and have the facility at the receiving SMS subscriber unit decode (translate) the original text into a different form. The facility at the receiving SMS subscriber unit can decode the original text of the SMS message to produce a decoded version of the received SMS message.

FIG. 1 is a diagram that illustrates selected components of an SMS subscriber unit implementing the facility, according to some embodiments. As depicted, an SMS subscriber unit 10, such as, by way of example, a cellular phone, a mobile phone, or other mobile communications device, comprises a translation component 102, an encoder component 104, a decoder component 106, and a translation information store 108. The translation information store contains the translation information (the sets of encoding rules and/or the sets of decoding rules) and other data structures used by the facility to send and receive enhanced SMS messages. The translation information facilitates the encoding and/or decoding of the SMS messages. The translation component is invoked to process incoming and outgoing SMS messages on the SMS subscriber unit. For an outgoing SMS message (i.e., SMS message that needs to be sent by the SMS subscriber unit), the translation component determines whether the outgoing SMS message needs to be encoded. If an outgoing SMS message needs to be encoded, the translation component invokes the encoder component to encode the SMS message. For an incoming SMS message (i.e., SMS message received by the SMS subscriber unit), the translation component determines whether the received SMS message needs to be decoded. If a received SMS message needs to be decoded, the translation component invokes the decoder component to decode the SMS message. Although not shown in FIG. 1, the SMS subscriber unit includes components that allow its user to use the SMS subscriber unit for their intended purpose as well as to send and receive SMS messages. For example, in the case where the SMS subscriber unit is a mobile telephone, the SMS subscriber unit also includes components that allow its user to make and receive telephone calls as well as to send and receive SMS messages.

Computing devices on which the facility may be implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the presence information system. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the facility, including the described techniques may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
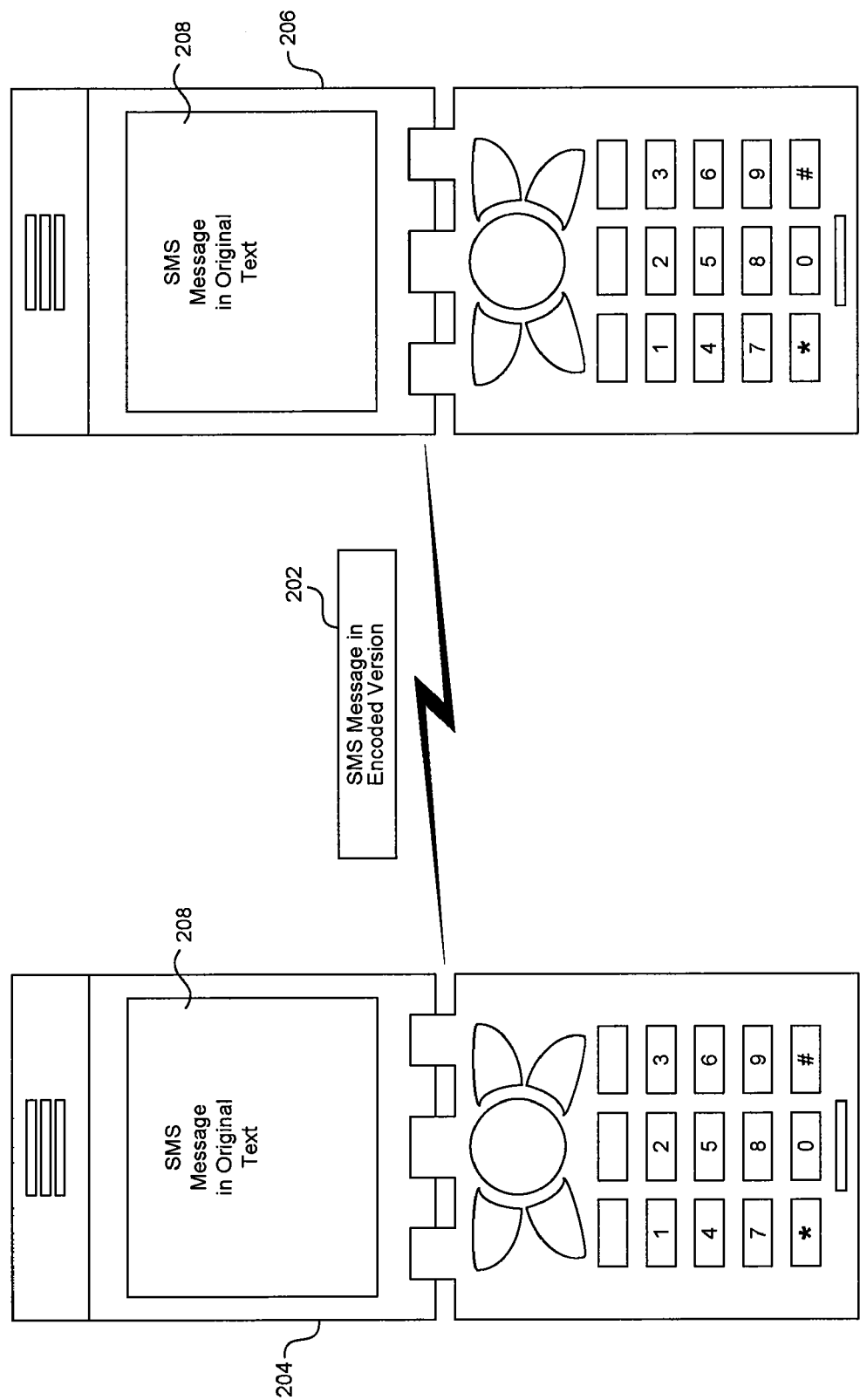
FIG. 2 is a block diagram that illustrates the transmission of an encoded SMS message, according to some embodiments.

FIG. 2 is a block diagram that illustrates the transmission of an encoded SMS message, according to some embodiments. This figure illustrates the sending of an encoded SMS message 202 between a sending SMS subscriber unit 204 and a receiving SMS subscriber unit 206. An SMS message 208 is input on the sending SMS subscriber unit. Upon determining that the original text of the input SMS message needs to be encoded, the facility at the sending SMS subscriber unit encodes the original text of the SMS message to produce the encoded SMS message. The sending SMS subscriber unit then transmits the encoded SMS message, and the encoded SMS message is eventually received by the receiving SMS subscriber unit. Upon determining that the encoded SMS message needs to be decoded, the facility at the receiving SMS subscriber unit decodes the encoded SMS message to produce the original text of the SMS message. Sending of encoded SMS messages allows for the sending of long messages using a single or reduced number of SMS messages than would otherwise be required without the encoding. By way of example, the facility at the sending SMS subscriber unit may provide one or more interfaces, such as user interfaces, which allow a subscriber to enter detailed, long messages (e.g., messages that may require sending in more than one SMS message). The facility can encode the messages input through the interfaces to reduce the amount of text, and send the encoded messages in possibly a smaller number of SMS messages as would have been required without the encoding. For example, one interface may allow the subscriber to input the subscriber's current employment information, as follows:

NAME: John Smith ADDRESS: 123 Main St., Seattle, Wash., 12345 AGE: 35 EMPLOYER: Acme Corporation EMPLOYER ADDRESS: 12 Industrial Drive, Seattle, Wash., 12389 POSITION: Supervisor YEARS EMPLOYED: 8

The facility at the sending SMS subscriber unit can encode the above message as follows:

John Smith 123 Main St., Seattle, Wash., 12345 35 Acme Corporation 12 Industrial Drive, Seattle, Wash., 12389 Supervisor 8

As can be seen in the example, while the original text of the message requires sending in two SMS messages, the encoded message can be sent as a single SMS message. In order to allow the facility at the receiving SMS subscriber unit to properly decode the encoded SMS message to produce the original text, the facility at the sending SMS subscriber unit may send a set of decoding rules (translation information) that facilitates the proper decoding of the encoded SMS message prior to sending the encoded SMS message. For the above example, the decoding rules may specify that: the first two terms of the encoded SMS message ("John Smith") are the name; the next three terms ("123 Main St.") are the street address; the next term ("Seattle") is the city; the next term ("Washington") is the state; the next term ("12345") is the zip code; the next term ("35") is the age; the next two terms ("Acme Corporation") are the employer name; the next three terms ("12 Industrial Drive") are the employer street address; the next term ("Seattle") is the employer city; the next term ("Washington") is the employer state; the next term ("12389") is the employer zip code; the next term ("Supervisor") is the employee's position; and the final term ("8") is the number of years employed. The facility at the sending SMS subscriber unit can then send the encoded SMS message and have the encoded SMS message properly decoded to produce the original text at the receiving SMS subscriber unit. The facility at the sending SMS subscriber unit may send with the encoded SMS message an indication of the set of decoding rules that are to be used to decode the encoded SMS message. This allows for the utilization of multiple sets of encoding rules and decoding rules by the sending and receiving SMS subscriber units.

Figure 3:
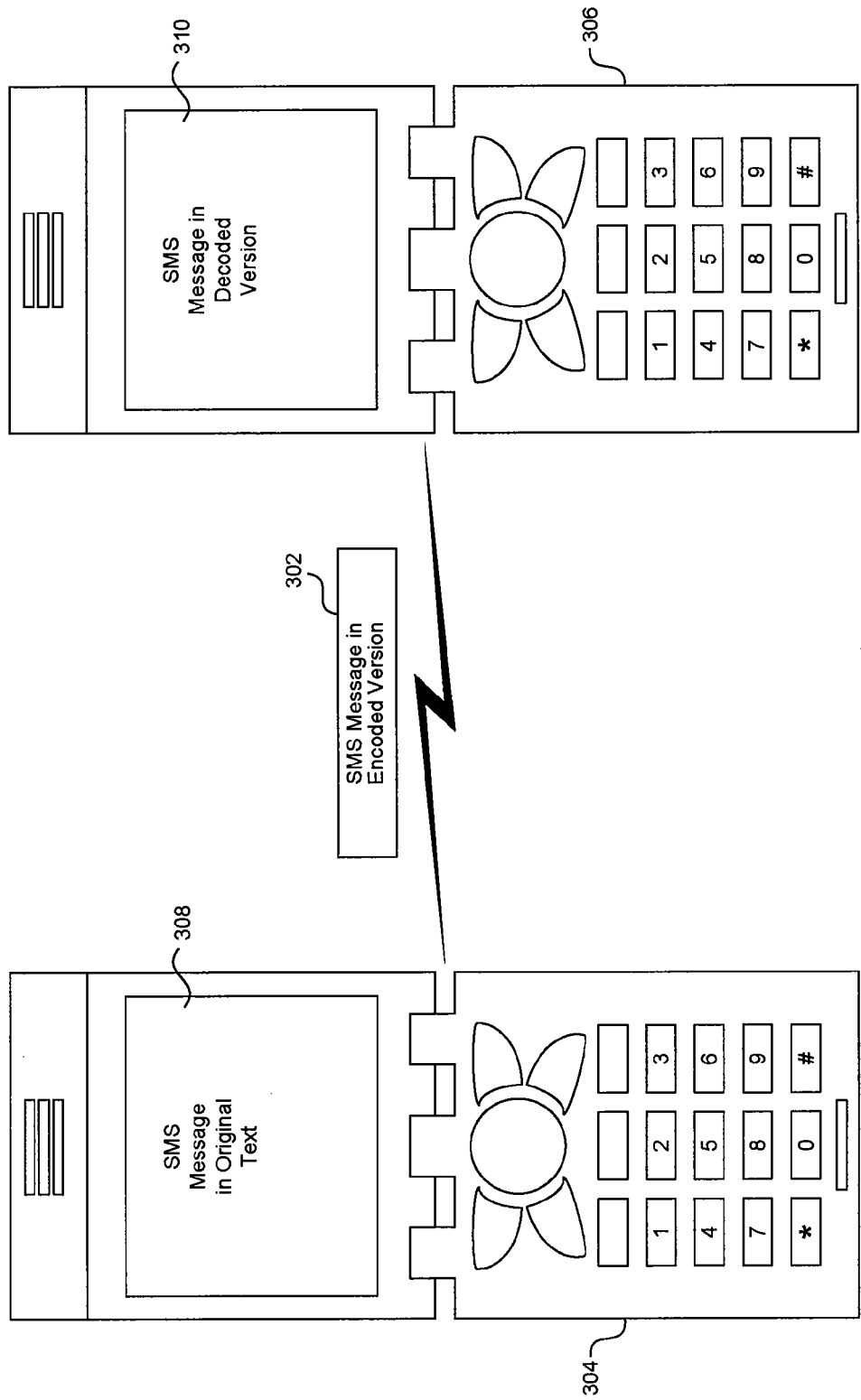
FIG. 3 is a block diagram that illustrates the transmission of an encoded SMS message, according to other embodiments.

FIG. 3 is a block diagram that illustrates the transmission of an encoded SMS message, according to other embodiments. This figure illustrates the sending of an encoded SMS message 302 between a sending SMS subscriber unit 304 and a receiving SMS subscriber unit 306. An SMS message 308 is input on the sending SMS subscriber unit. Upon determining that the original text of the input SMS message needs to be encoded, the facility at the sending SMS subscriber unit encodes the original text of the SMS message to produce the encoded SMS message. The sending SMS subscriber unit then transmits the encoded SMS message, and the encoded SMS message is eventually received by the receiving SMS subscriber unit. Upon determining that the encoded SMS message needs to be decoded, the facility at the receiving SMS subscriber unit decodes the encoded SMS message to produce a decoded SMS message 310. The decoded SMS message is different from the original text of the SMS message input on the sending SMS subscriber unit. Sending of encoded SMS messages allows for the sending of long messages using a single or reduced number of SMS messages than would otherwise be required without the encoding. Decoding an encoded SMS message to produce a decoded SMS message that is different than the original text of the SMS message allows for the transformation of the encoded SMS message to a form that may be more readily digested by the receiver of the SMS message. By way of example, the original text of the SMS message may be in a language (e.g., English) that is understandable by the sender, and the decoded SMS message may be in another language (e.g., Japanese) that is understandable to the receiver.

Sending of encoded SMS messages and having the encoded SMS messages decoded at the receiving SMS subscriber unit provides added security over just sending the original text of SMS messages. By way of example, the original text of an SMS message can be encoded into a cryptic or encrypted form, which is then transmitted. This form of transmission may be desirable to applications, such as financial or banking applications, which process sensitive information.

Figure 4:
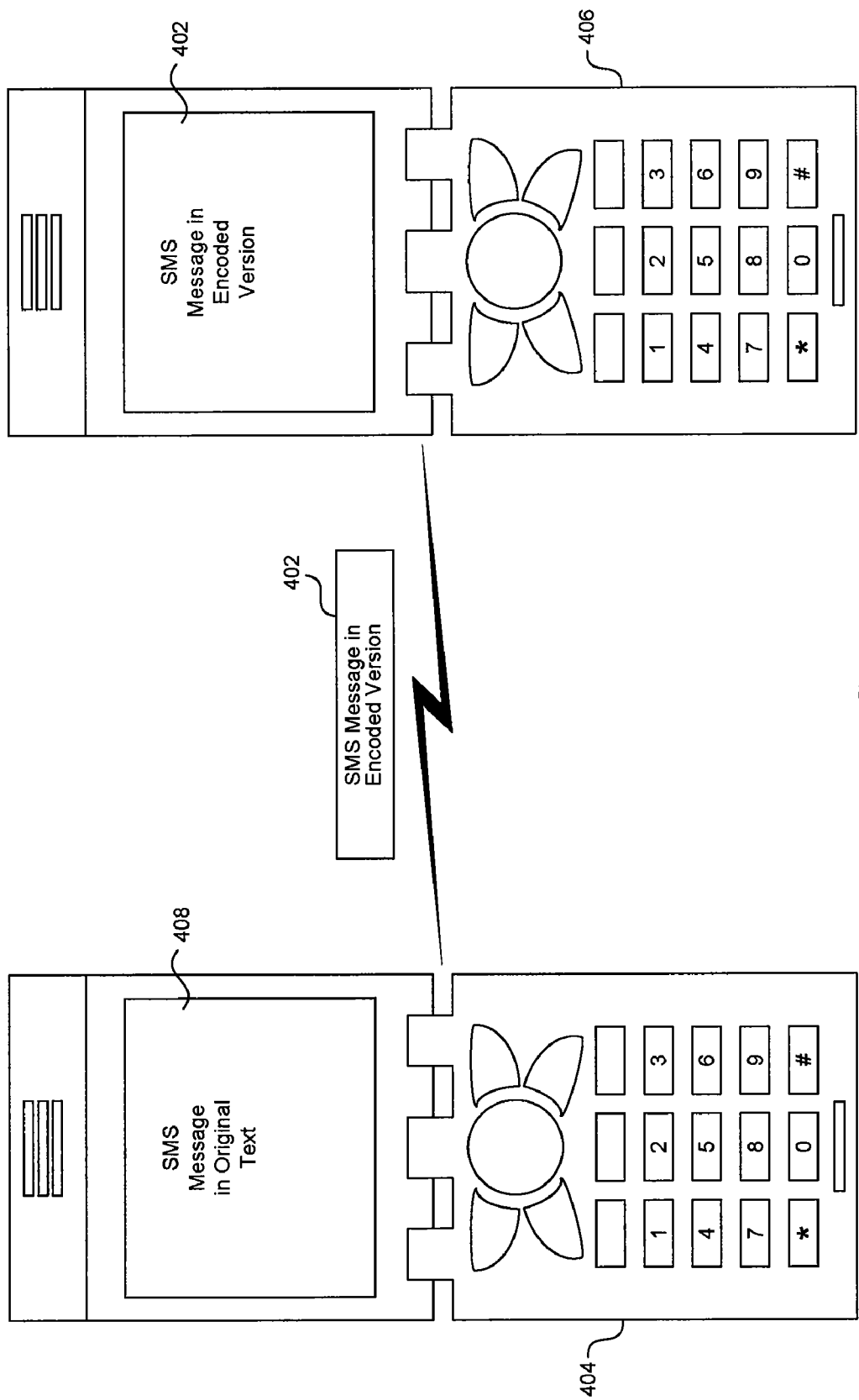
FIG. 4 is a block diagram that illustrates the transmission of an encoded SMS message, according to still other embodiments.

FIG. 4 is a block diagram that illustrates the transmission of an encoded SMS message, according to still other embodiments. This figure illustrates the sending of an encoded SMS message 402 between a sending SMS subscriber unit 404 and a receiving SMS subscriber unit 406. An SMS message 408 is input on the sending SMS subscriber unit. Upon determining that the original text of the input SMS message needs to be encoded, the facility at the sending SMS subscriber unit encodes the original text of the SMS message to produce the encoded SMS message. The sending SMS subscriber unit then transmits the encoded SMS message, and the encoded SMS message is eventually received by the receiving SMS subscriber unit. Upon determining that the encoded SMS message does not need to be decoded, the facility at the receiving SMS subscriber unit does not alter the encoded SMS message, and the encoded SMS message is output, for example, on the receiving SMS subscriber unit's display device for viewing by the receiving subscriber. By way of example, the sender of an SMS message may be a father of a teenager. While the father may find it more convenient to input full text messages, the teenager may find it more convenient to receive cryptic messages. In order to send full text messages to the teenager who finds it convenient to receive cryptic messages, the father can create a set of encoding rules that facilitates the translation of full text into cryptic text that is understandable by the teenager on his SMS subscriber unit. For example, the facility may provide an interface with which the subscriber can create a set of encoding rules. In some embodiments, the facility may provide an interface through which the subscriber can specify the location of a set of encoding rules. The facility can then retrieve (e.g., download) the set of encoding rules from the specified location. The father can then input a full text SMS message for sending to the teenager, and the full text SMS message can be encoded into cryptic text on the father's SMS subscriber unit according to a specified set of encoding rules prior to sending to the teenager's SMS subscriber unit.

Figure 5:
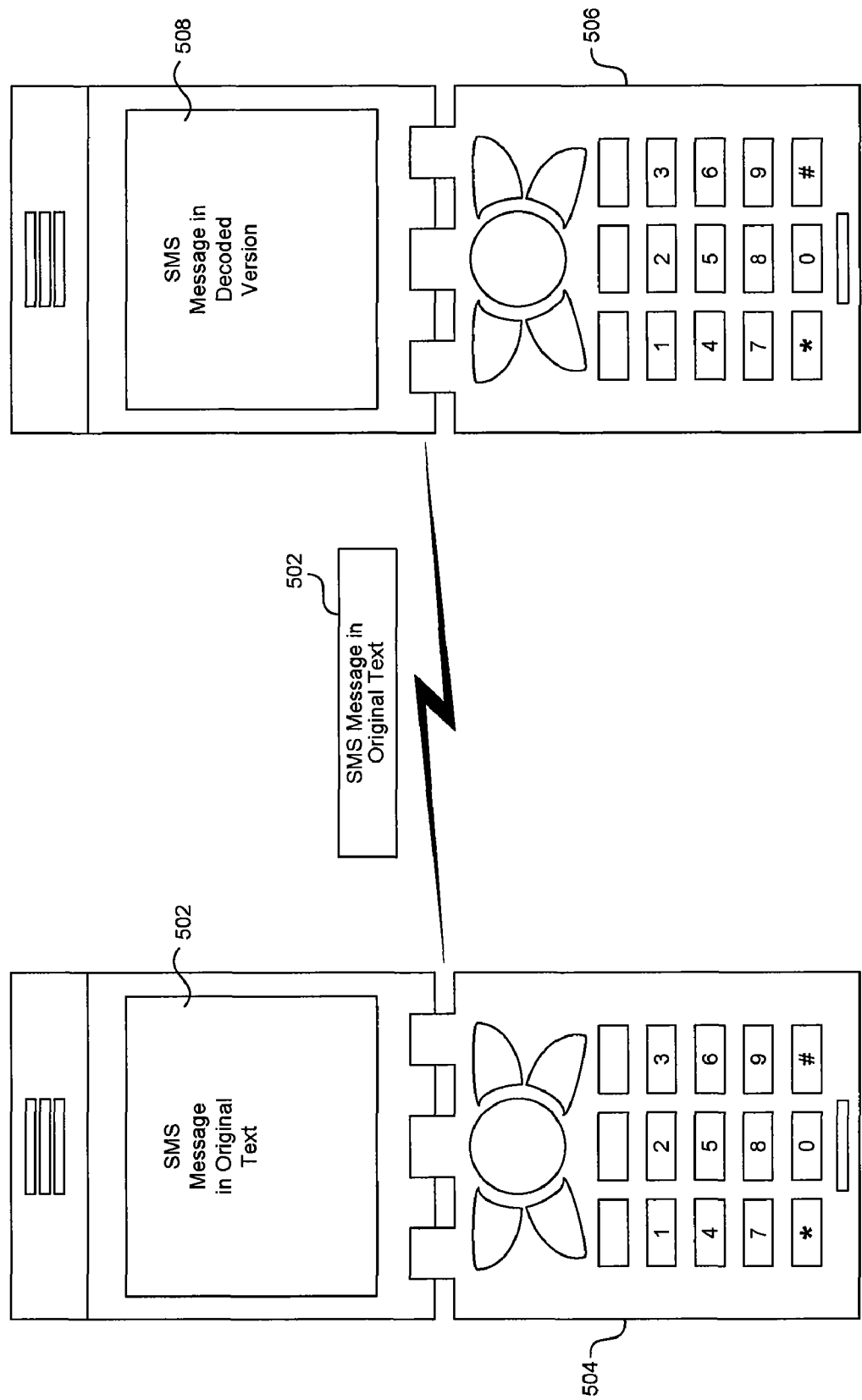
FIG. 5 is a block diagram that illustrates the transmission of an SMS message, according to some embodiments.

FIG. 5 is a block diagram that illustrates the transmission of an SMS message, according to some embodiments. This figure illustrates the sending of an SMS message 502 between a sending SMS subscriber unit 504 and a receiving SMS subscriber unit 506. The original text of the SMS message is input on the sending SMS subscriber unit. Upon determining that the original text of the input SMS message does not need to be encoded, the facility at the sending SMS subscriber unit produces the original text of the SMS message for transmission. The sending SMS subscriber unit then transmits the original text SMS message, and the original text SMS message is eventually received by the receiving SMS subscriber unit. Upon determining that the original text of the SMS message needs to be decoded, the facility at the receiving SMS subscriber unit decodes the original text to produce a decoded SMS message 508. By way of example, the sender of an SMS message may be a teenage subscriber that finds it more convenient to input cryptic messages and may have developed a habit of typing such messages on his SMS subscriber unit. In order to send cryptic SMS messages to his mother who does not understand cryptic messages, the teenage subscriber can use his SMS subscriber unit to send a set of decoding rules that facilitates the translation of cryptic messages into full text (e.g., non-cryptic text) to his mother's SMS subscriber unit. In some embodiments, the teenage subscriber may use his SMS subscriber unit to specify to the mother's SMS subscriber unit the location of a set of decoding rules that facilitates the translation of cryptic messages into full text. The facility at the mother's SMS subscriber unit can then retrieve (e.g., download) the set of decoding rules from the specified location. The teenage subscriber can then input a cryptic SMS message on his SMS subscriber unit for sending to his mother, and the cryptic SMS message can be decoded into full text according to a set of specified decoding rules on the mother's SMS subscriber unit.

Figure 6:
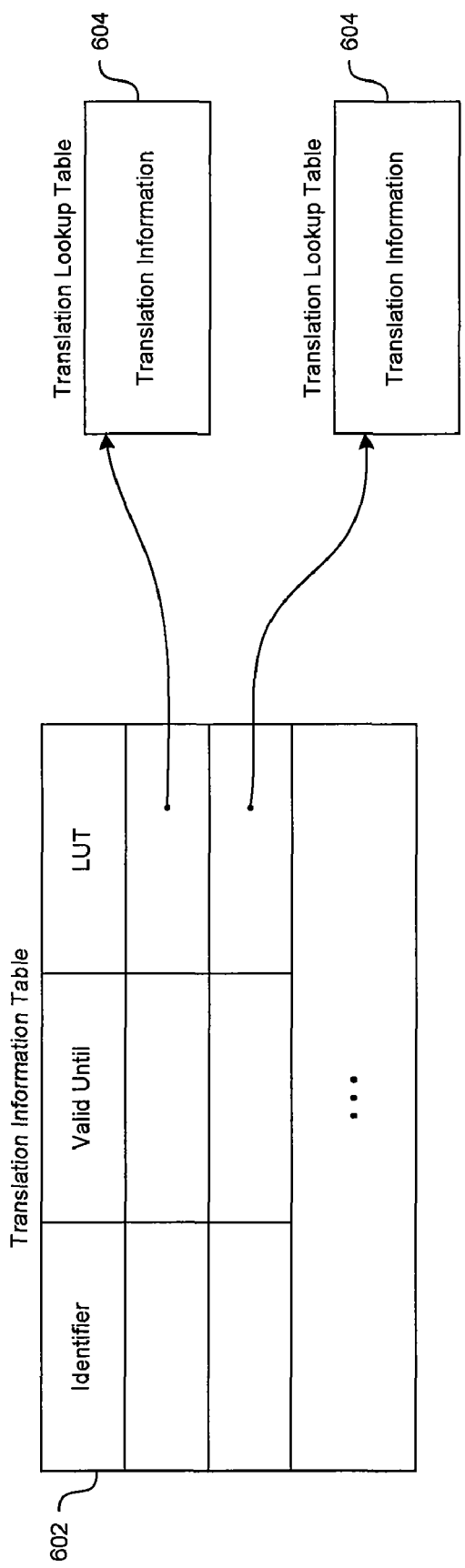
FIG. 6 is a data structure diagram that illustrates example logical data structures of the facility, according to some embodiments.

FIG. 6 is a data structure diagram that illustrates example logical data structures of the facility, according to some embodiments. The data structures may include a translation information table 602 that includes an entry for each set of translation information (e.g., for each set of encoding rules or decoding rules). Each entry in the translation information table is shown comprising, by way of example, an identifier field, a valid until field, and a lookup table (LUT) field. The content of the identifier field uniquely identifies the corresponding set of translation information. The content of the valid until field specifies the period for which the corresponding set of translation information is valid. The content of the LUT field points to a translation lookup table 604. The translation lookup table contains the set of translation information or rules (e.g., the set of encoding rules or the set of decoding rules) that facilitate the encoding or decoding of the SMS messages. For example, the translation lookup table may contain a mapping of terms and/or phrases from one version (form) to another version (form). One skilled in the art will appreciate that this is only one example of the logical layout of the data structures of the facility. The data structures of the facility may be tailored to the space/computation requirements of the facility, including the SMS subscriber unit on which the facility executes.

Figure 7:
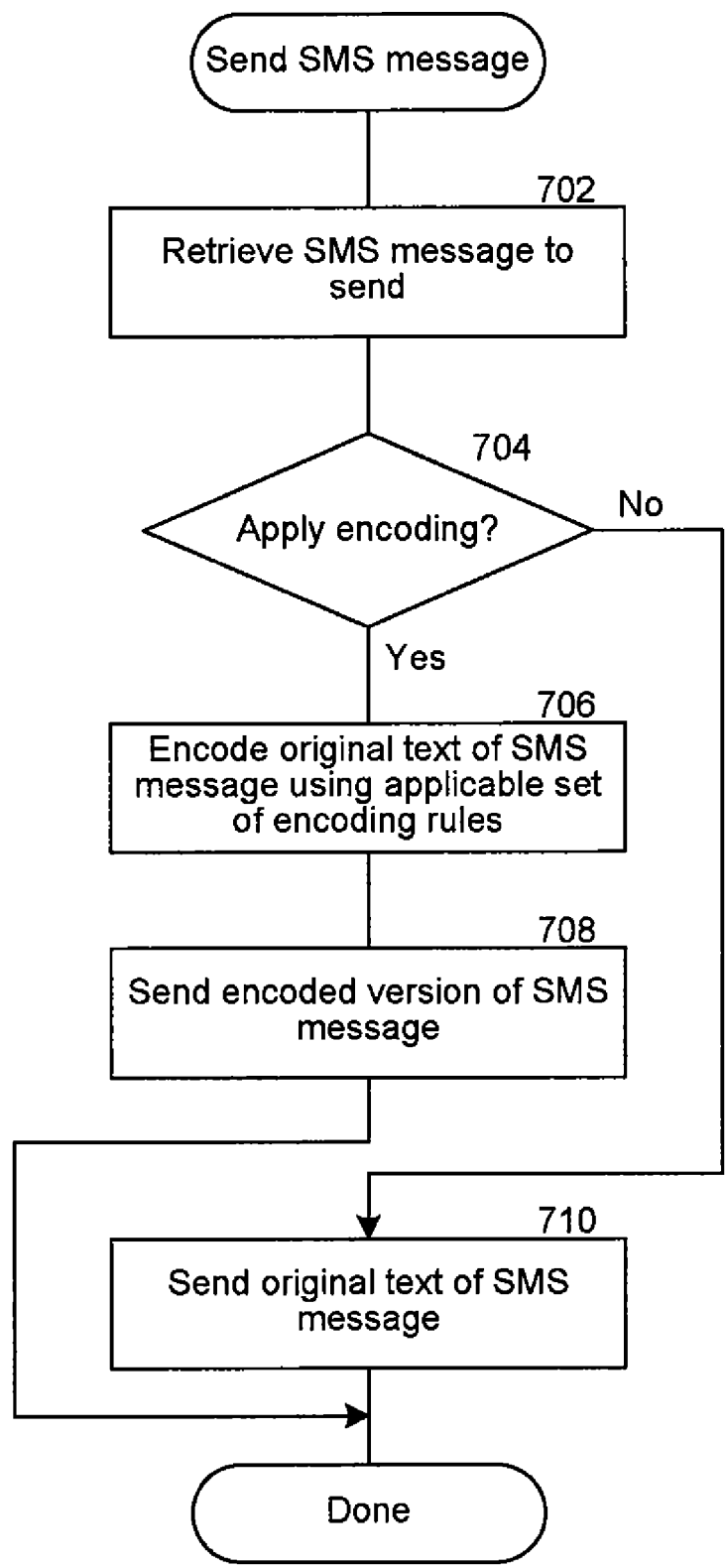
FIG. 7 is a flow diagram that illustrates the processing of a component of the SMS subscriber unit to send an SMS message, according to some embodiments.

FIG. 7 is a flow diagram that illustrates the processing of a component of the SMS subscriber unit to send an SMS message, according to some embodiments. By way of example, the translation component detects that an SMS message needs to be sent by the SMS subscriber unit and processes the SMS message prior to sending by the SMS subscriber unit. In block 702, the translation component retrieves the SMS message that is to be sent. In decision block 704, if the original text of the SMS message needs to be encoded, then the translation component continues at block 706, else the translation component continues at block 710. In block 706, the translation component encodes the original text of the SMS message to produce an encoded SMS message using an applicable set of encoding rules. For example, the translation component may invoke the encoding component to encode the original text of the SMS message. The applicable set of encoding rules to use in encoding the original text of the SMS message may have been specified with the SMS message. In block 708, the translation component sends the encoded SMS message and completes. The translation component may invoke another component of the SMS subscriber unit to send the encoded SMS message. In block 710, the translation component sends the SMS message containing the original text and completes. Here, the translation component does not apply an encoding to the original text of the SMS message prior to sending.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 8:
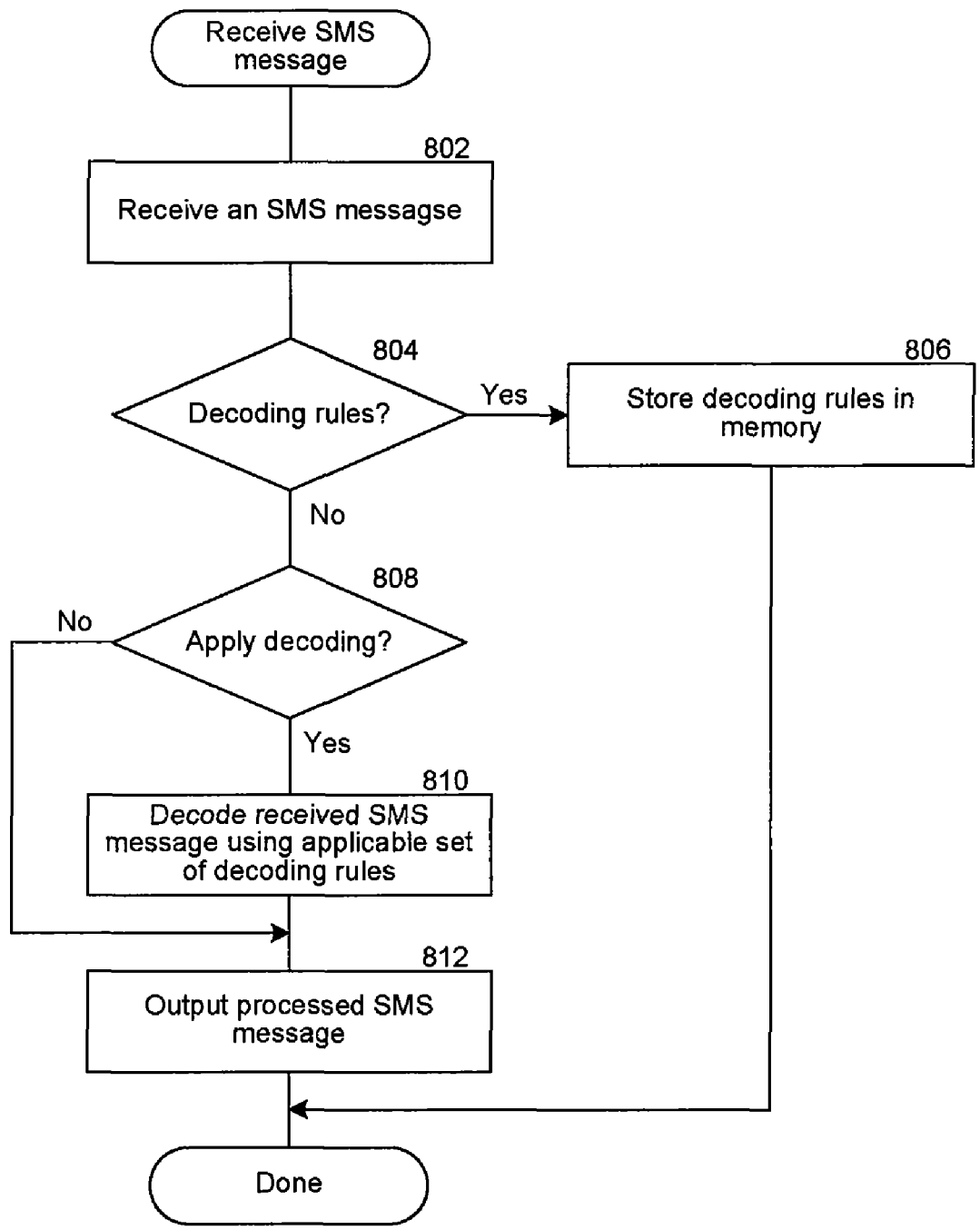
FIG. 8 is a flow diagram that illustrates the processing of a component of the SMS subscriber unit to process a received SMS message, according to some embodiments.

FIG. 8 is a flow diagram that illustrates the processing of a component of the SMS subscriber unit to process a received SMS message, according to some embodiments. By way of example, the translation component detects that an SMS message received by the SMS subscriber unit needs to be processed before being output to a storage location (e.g., an SMS inbox) on the SMS subscriber unit. In block 802, the SMS subscriber unit receives an SMS message. In decision block 804, if the received SMS message contains decoding rules, then the translation component continues at block 806, else the translation component continues at decision block 808. In block 806, the translation component stores the decoding rules for subsequent use and completes. For example, the translation component may store the decoding rules in cache memory or non-volatile memory on the SMS subscriber unit. In decision block 808, if the received version of the SMS message needs to be decoded, then the translation component continues at block 810, else the translation component continues at block 812. In block 810, the translation component decodes the received SMS message to produce a decoded SMS message using an applicable set of decoding rules, and continues at block 812. For example, the translation component may invoke the decoding component to decode the contents of the received SMS message. The applicable set of decoding rules to use in decoding the received SMS message may have been specified with the received SMS message. In some embodiments, the identification of the sender of the SMS message may function as an indication of the applicable set of decoding rules to apply. In some embodiments, the identification of the sender of the SMS message and the specified applicable period for the set of decoding rules may function as an indication of the applicable set of decoding rules to apply. In block 812, the translation component outputs the processed SMS message (either received SMS message or the decoded SMS message) to, for example, a storage location for subsequent retrieval and viewing on the SMS subscriber unit, and completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the translation information has been described as containing a mapping of terms and/or phrases from one version to another version, the translation information may be an executable that is executed by the facility on the SMS subscriber unit to translate (encode and/or decode) the SMS messages. In some instances, steps have been described as being performed by certain components of the facility executing on the SMS subscriber unit, but they could also be performed by other components of the SMS subscriber unit. Accordingly, the invention is not limited except as by the appended claims.

We claim:

1. A computer-implemented method performed by a device having a memory and a processor for transmitting a Short Message Service (SMS) message from a first SMS subscriber unit to a second SMS subscriber unit, the method comprising:
   under the control of the first SMS subscriber unit,
   creating a set of encoding rules at least in part by,
   displaying on the first SMS subscriber unit an interface through which a user of the first SMS subscriber unit can create at least one encoding rule,
   for each of a first plurality of encoding rules,
   receiving, through the displayed interface, a first text version of a word and a second text version of the word, and
   storing within a translation lookup table the received first text version of the word and the received second text version of the word as the encoding rule, and
   for each of a second plurality of encoding rules,
   receiving, through the displayed interface, a first text version of a phrase and a second text version of the phrase, and
   storing within the translation lookup table the received first text version of the phrase and the received second text version of the phrase as the encoding rule, storing an indication of the created set of encoding rules within a translation information table on the first SMS subscriber unit, the translation information table including a unique identifier for the created set of encoding rules, an indication of a time at which the created set of rules becomes invalid, and a pointer to the translation lookup table;
   retrieving an original text of an SMS message to send to the second SMS subscriber unit;
   upon determining that an encoding should be applied to the SMS message, displaying on the first SMS subscriber unit an indication of a plurality of sets of encoding rules stored on the first SMS subscriber unit, the plurality of sets of encoding rules including the created set of encoding rules, each set of encoding rules specifying a different set of rules for encoding the original text of an SMS message to an encoded text version of the original text,
   receiving a selection of a set of encoding rules, the selection having been made by a user of the first SMS subscriber unit, with a processor, encoding the original text of the SMS message to an encoded text version of the original text in accordance with the user-selected set of encoding rules, and
   transmitting to the second SMS subscriber unit the encoded text version of the original text of the SMS message, a set of decoding rules that are to be used to decode the encoded text version of the original text, wherein the decoding rules are specified using XML and further wherein each decoding rule specifies an encoded version of a word, a decoded version of the word, and a number corresponding to the quantity of SMS messages to which the set of decoding rules are to be applied so that the encoded text version of the original text can be decoded using the transmitted decoding rules, wherein the second SMS subscriber unit is configured to apply the decoding rules to received messages no more than the transmitted number of times; and
   upon determining with a processor that an encoding should not be applied, transmitting to the second SMS subscriber unit the original text of the SMS message.

2. The method of claim 1, wherein the original text is text input by a user of the first SMS subscriber unit.

3. The method of claim 1, wherein the original text comprises decoding information that is to be utilized by the second SMS subscriber unit.

4. The method of claim 1, wherein encoding the original text to the encoded text version of the original text reduces the size of the SMS message.

5. The method of claim 1 further comprising:
   under the control of the second SMS subscriber unit,
   receiving the encoded text sent by the first SMS subscriber unit;
   upon determining that a decoding should be applied to the encoded text, decoding the encoded text to decoded text; and
   outputting the decoded text
   wherein the original text is different from the encoded text, wherein the encoded text is different from the decoded text, and wherein the decoded text is different from the original text; and
   upon determining that a decoding should not be applied, outputting the encoded text.

6. The method of claim 5 wherein outputting the decoded text comprises placing the decoded text in an inbox.

7. The method of claim 5 wherein outputting the decoded text comprises outputting the decoded text to a display device of the second SMS subscriber unit.

8. The method of claim 5 wherein outputting the encoded text comprises placing the encoded text in an inbox without decoding the encoded text.

9. The method of claim 5 wherein outputting the encoded text comprises outputting the encoded text to a display device of the second SMS subscriber unit without decoding the encoded text.

10. The method of claim 1, wherein the second SMS subscriber unit is configured to receive the encoded text sent by the first SMS subscriber unit, identify, based at least in part on an identification of the sender of the encoded text, an applicable set of decoding rules to apply to the encoded text, and apply the identified set of applicable decoding rules to the encoded text.

11. A computer-readable storage device encoded with computer executable instructions for controlling a Short Message Service (SMS) subscriber unit having a memory and a processor to transmit a SMS message, by a method comprising: retrieving an SMS message to transmit, the SMS message comprising SMS message contents in original text;
  upon determining that the SMS message contents are to be encoded,
  for each of a plurality of available sets of encoding rules for encoding the SMS message contents, displaying on the SMS subscriber unit an indication of the available set of encoding rules, wherein each set of encoding rules specifies a different set of rules for encoding SMS message contents in original text to SMS message contents in encoded text, receiving a user-made selection of an available set of encoding rules,
  with a processor, encoding the SMS message contents from the original text to an encoded version of the original text in accordance with the selected set of encoding rules,
  transmitting a set of decoding rules, each decoding rule specifying a word and a decoded version of the word, wherein the set of decoding rules is not the inverse of the selected set of encoding rules so that decoded text is different from the original text and so that decoded text is different from the encoded version of the original text, and transmitting the SMS message comprising SMS message contents in the encoded version of the original text; and
  upon determining that the SMS message contents are not to be encoded, transmitting the SMS message comprising SMS message contents in the original text.

12. The computer-readable storage device of claim 11, wherein the encoded version of the original text is a reduced encoding of the original text.

13. The computer-readable storage device of claim 11, further-comprising instructions for displaying an interface through which a user can create a set of encoding rules.

14. A computing system for transmitting a Short Message Service (SMS) message, the system comprising:
  a first mobile communication device configured to,
    receive from a first user original text in a first language to be sent as an SMS message,
    display an indication of a first plurality of sets of translation rules stored on the first mobile communication device, each of the first plurality of sets of translation rules specifying a different set of rules for translating text of an SMS message from one language to another language,
    receive from the first user a first selection of a set of translation rules,
    generate a first translated text by translating the original text from the first language to a second language based on the first selected set of translation rules, wherein the second language is different from the first language,
    generate an SMS message that includes the first translated text, and
    transmit the SMS message to another mobile communication device; and
  a second mobile communication device configured to,
    receive the SMS message transmitted from the first mobile communication device, the SMS message including the first translated text, and
    upon determining that that the first translated text is to be translated before being displayed on the second mobile communication device,
      display an indication of a second plurality of sets of translation rules, each of the second plurality of sets of translation rules specifying rules for translating text of an SMS message from one language to another language,
      receive from a second user a second selection of a set of translation rules,
      generate a second translated text by translating the first translated text from the second language to a third language based on the second selected set of translation rules, wherein the third language is different from the second language and wherein the third language is different from the first language, and
      output the second translated text in the third language.

15. The computing system of claim 14, wherein outputting the second translated text in the third language comprises placing the second translated text in an inbox.

16. The computing system of claim 14, wherein outputting the second translated text in the third language comprises outputting the second translated text to a display device of the second mobile communication device.

17. The computing system of claim 14, wherein the second mobile communication device is further configured to:
  upon determining that the received SMS message comprises decoding information to be utilized by the second SMS subscriber unit, store the decoding information.

18. The computing system of claim 17, wherein the decoding information comprises an indication of an applicable period during which the decoding information is valid.

19. The computing system of claim 14 wherein the first mobile communication device is further configured to display an interface through which a user can create a set of encoding rules.

* * * * *